US012628192B2

(12) United States Patent
Zhao

(10) Patent No.: US 12,628,192 B2
(45) Date of Patent: May 12, 2026

(54) COMMUNICATION METHOD AND COMMUNICATION DEVICE

(71) Applicant: BEIJING XIAOMI MOBILE SOFTWARE CO., LTD., Beijing (CN)

(72) Inventor: Wensu Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 311 days.

(21) Appl. No.: 18/281,551

(22) PCT Filed: Mar. 11, 2021

(86) PCT No.: PCT/CN2021/080311
§ 371 (c)(1),
(2) Date: Sep. 11, 2023

(87) PCT Pub. No.: WO2022/188112
PCT Pub. Date: Sep. 15, 2022

(65) Prior Publication Data
US 2024/0155659 A1 May 9, 2024

(51) Int. Cl.
*H04W 72/53* (2023.01)
*H04W 72/40* (2023.01)

(52) U.S. Cl.
CPC ........... *H04W 72/53* (2023.01); *H04W 72/40* (2023.01)

(58) Field of Classification Search
CPC .............................. H04W 72/53; H04W 72/40
See application file for complete search history.

(56) References Cited

U.S. PATENT DOCUMENTS

| | | | |
|---|---|---|---|
| 2020/0146066 A1 | 5/2020 | Nguyen et al. | |
| 2020/0154440 A1* | 5/2020 | Gholmieh | H04W 4/40 |
| 2020/0351033 A1* | 11/2020 | Ryu | H04L 1/1861 |
| 2021/0050950 A1* | 2/2021 | Zhou | H04L 1/1861 |
| 2022/0078040 A1* | 3/2022 | Lee | H04L 5/003 |
| 2022/0167351 A1* | 5/2022 | Levitsky | H04W 4/46 |

FOREIGN PATENT DOCUMENTS

| | | | | |
|---|---|---|---|---|
| CN | 106658609 A | 5/2017 | | |
| CN | 108024266 A | 5/2018 | | |
| CN | 110062465 A | 7/2019 | | |
| CN | 111194057 A | 5/2020 | | |
| CN | 111432376 A | 7/2020 | | |
| JP | 2024502053 A * | 1/2024 | ........... | H04W 72/25 |
| WO | WO-2009088858 A1 * | 7/2009 | ........... | H04W 72/23 |
| WO | WO-2017161978 A1 * | 9/2017 | ........... | H04W 72/04 |

OTHER PUBLICATIONS

International Search Report of PCT/CN2021/080311 dated Dec. 8, 2021 with English translation, (4p).

(Continued)

*Primary Examiner* — Kenny S Lin
(74) *Attorney, Agent, or Firm* — Arch & Lake LLP

(57) ABSTRACT

The present disclosure provides a communication method and a communication device. In the communication method, in response to determining that a reserved resource for transmitting data is subject to a consecutive resource collision in a plurality of transmission periods, data transmission with the reserved resource is stopped.

12 Claims, 12 Drawing Sheets

S21

Determining a first number of transmission failures, the first number of transmission failures being a number of failures of first transmissions of TB in the plurality of transmission periods within a first window

S22

Determining, in response to determining that the first number of transmission failures is greater than or equal to a threshold of the first number of transmission failures allowed within the first window, that the reserved resource for transmitting data is subject o the consecutive resource collision in the plurality of transmission periods

(56) References Cited

OTHER PUBLICATIONS

Apple, "Inter-UE Coordination for Mode 2 Resource Allocation", 3GPP TSG RAN WG1 #104-e, e-Meeting, Jan. 25-Feb. 5, 2021, R1-2101358, (8p).

Apple, "Discussion on Inter-UE Coordination for Mode 2 Resource Allocation", 3GPP TSG RAN WG1 #103-e R1-2008447 e-Meeting, Oct. 26-Nov. 13, 2020, (5p).

The First CNOA Issued in Application No. 202180000787.X, dated Apr. 6, 2022, with English translation, (15p).

The Notification to Grant Patent Right for Invention Issued in Application No. 202180000787.X, dated Dec. 15, 2022, (3p).

* cited by examiner

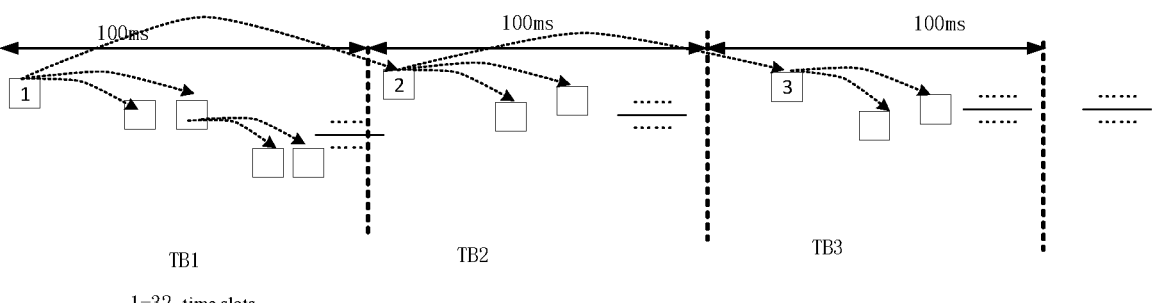
TB1
1-32 time slots
FIG. 3
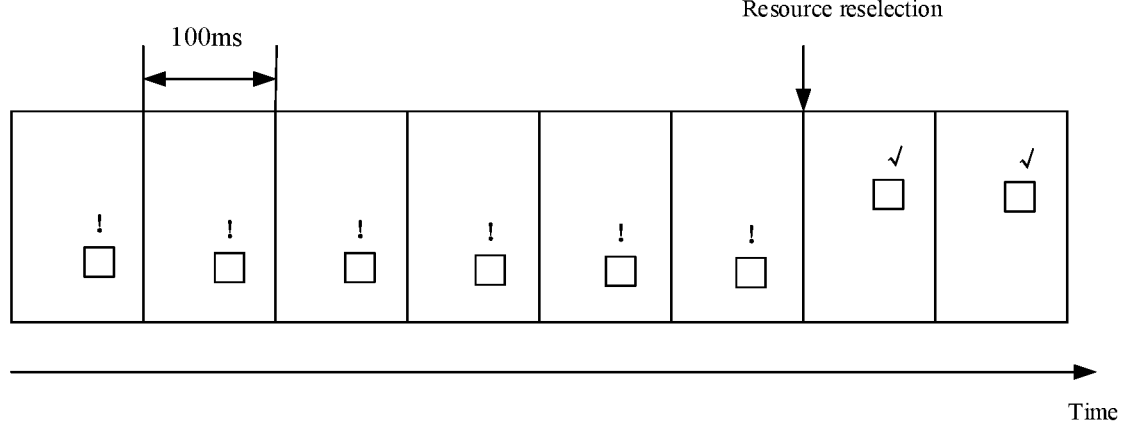
Resource reselection
100ms
Time
FIG. 4
Stopping, in response to determining that a reserved resource for transmitting data is subject to a consecutive resource collision in a plurality of transmission periods, transmitting data with the reserved resource
S11
FIG. 5

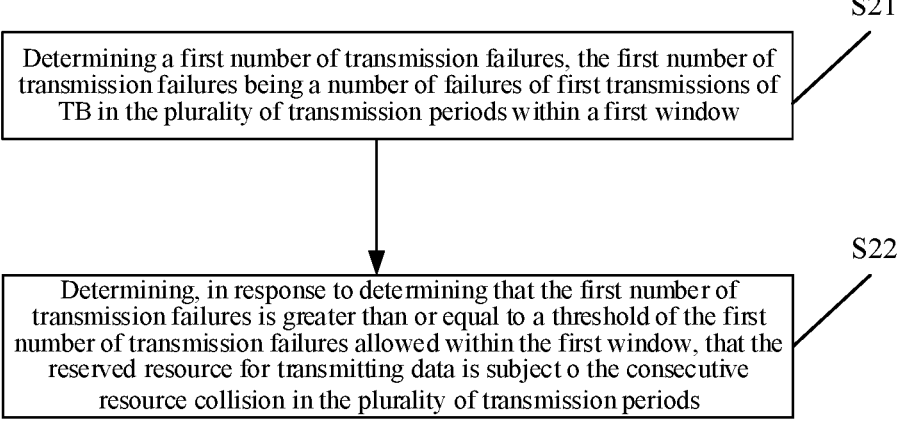

S21

Determining a first number of transmission failures, the first number of transmission failures being a number of failures of first transmissions of TB in the plurality of transmission periods within a first window

S22

Determining, in response to determining that the first number of transmission failures is greater than or equal to a threshold of the first number of transmission failures allowed within the first window, that the reserved resource for transmitting data is subject o the consecutive resource collision in the plurality of transmission periods

FIG. 6

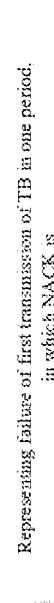

Representing failure of first transmission of TB in one period. in which NACK is fed back or no feedback is received for transmission failure (broadcast)

Representing failure of TB retransmission in one period. in which NACK is fed back or no feedback is received for transmission failure (broadcast)

Representing final successful transmission of this TB

Representing resource reserved for TB transmission

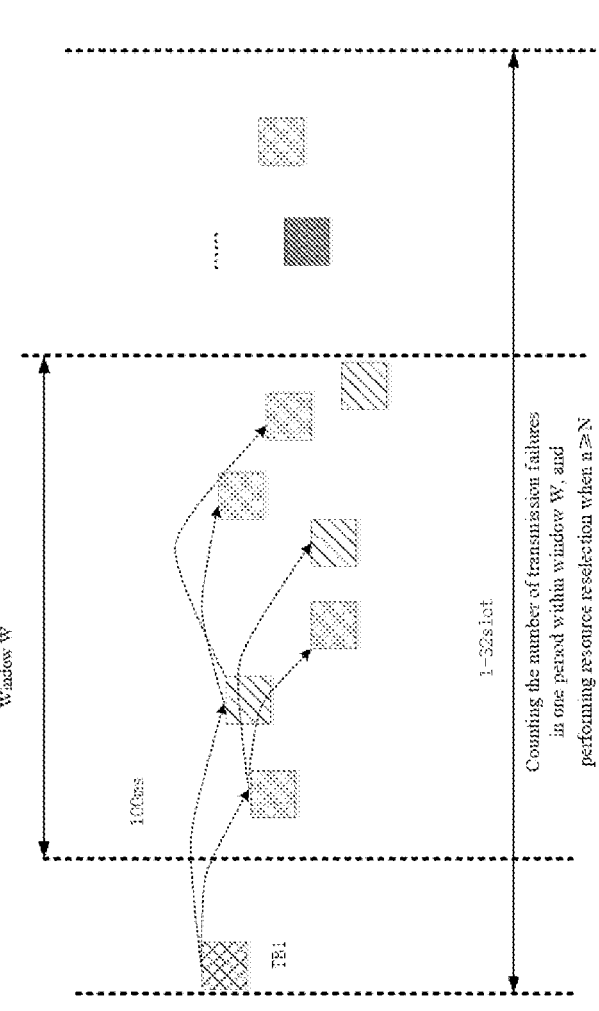

FIG. 9

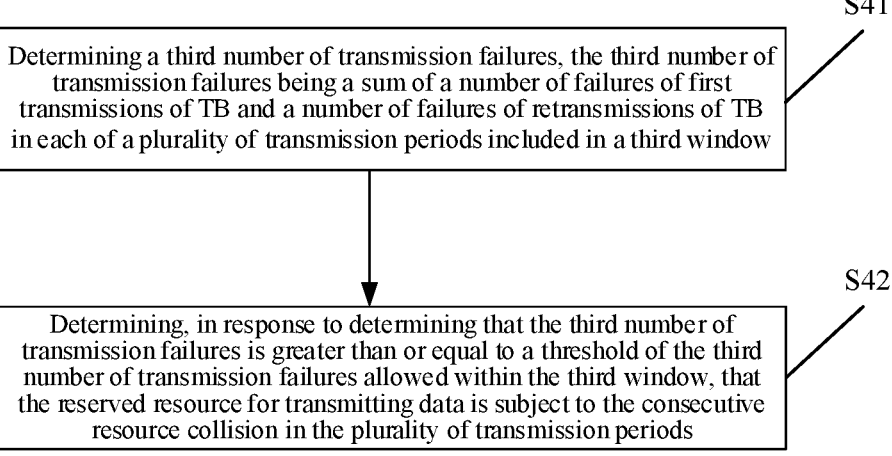

S41

Determining a third number of transmission failures, the third number of transmission failures being a sum of a number of failures of first transmissions of TB and a number of failures of retransmissions of TB in each of a plurality of transmission periods included in a third window

S42

Determining, in response to determining that the third number of transmission failures is greater than or equal to a threshold of the third number of transmission failures allowed within the third window, that the reserved resource for transmitting data is subject to the consecutive resource collision in the plurality of transmission periods

FIG. 10

Transmitting, in response to determining that a reserved resource for a first user device transmitting data is subject to a consecutive resource collision in a plurality of transmission periods, a resource consecutive collision indication

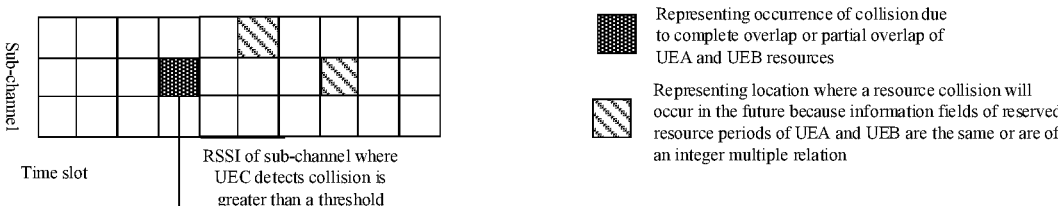

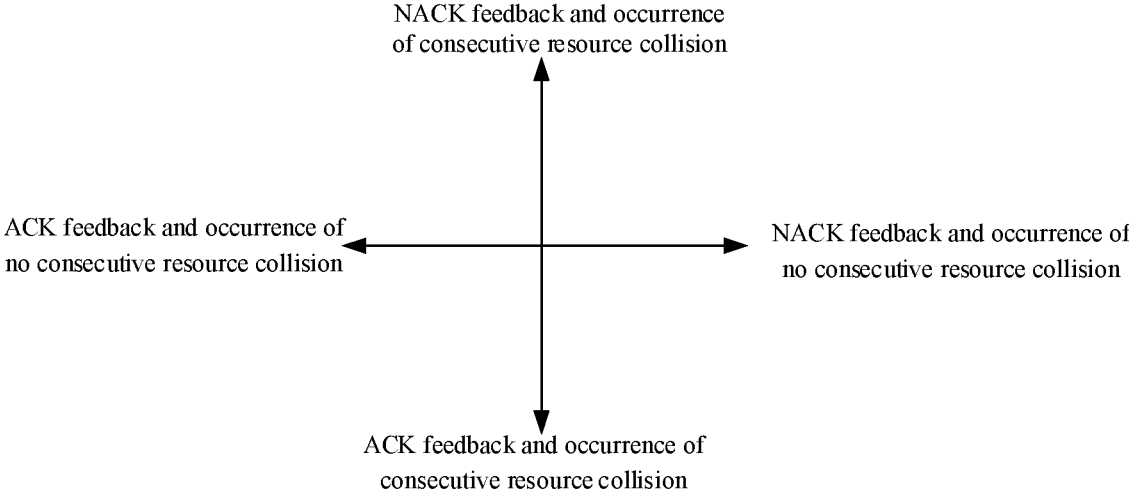

UEC detects that collision has occurred, decodes 1st SCI of UEA and UEB, and finds that information fields of reserved resource periods of the two are the same or are of an integer multiple relation

FIG. 13

NACK feedback and occurrence of consecutive resource collision

ACK feedback and occurrence of no consecutive resource collision

NACK feedback and occurrence of no consecutive resource collision

ACK feedback and occurrence of consecutive resource collision

FIG. 14

Determining, in response to receiving a resource consecutive collision indication from a second user device, that the reserved resource for transmitting data is subject to the consecutive resource collision in the plurality of transmission periods

Receiving the resource consecutive collision indication from the second user device by multiplexing PSFCH resource

FIG. 16

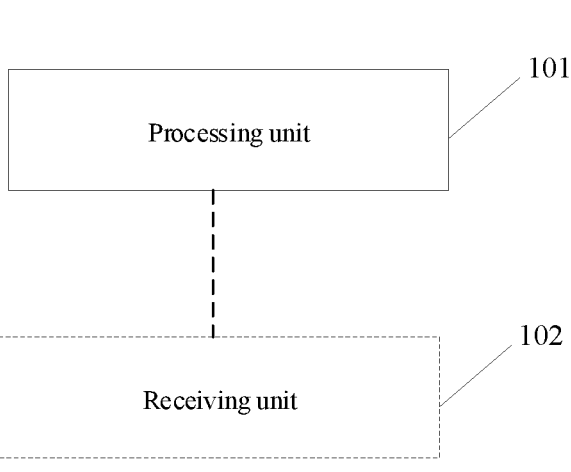

100

Processing unit

101

Receiving unit

Processing unit

202

Transmitting unit

COMMUNICATION METHOD AND COMMUNICATION DEVICE

CROSS-REFERENCE TO RELATED APPLICATIONS

The present application is the U.S. National Stage of International Application No. PCT/CN2021/080311 filed on Mar. 11, 2021, the entire contents of which are incorporated herein by reference for all purposes.

TECHNICAL FIELD

The present disclosure relates to the field of communication technology, and in particular to a communication method, a communication device and a storage medium.

BACKGROUND

Since the Long Term Evolution (LTE), the Third Generation Partnership (3GPP) has been developing the Sidelink standard as a standard for direct end-to-end communication. In July 2020, the first Sidelink standard of New Radio (NR) was completed in Rel-16, where the NR Sidelink solution is focused on Vehicle to Everything (V2X) and public safety. For V2X and public safety, due to time constraints, Release 16 does not fully support service requirements and operation schemes, and the Service and System Aspects (SA) is making some enhancements to the NR Sidelink in Release 17, such as architectural enhancements and system enhancements for 3GPP supporting advanced V2X services. In addition, other business use cases related to the NR Sidelink, such as interactive services for network control, enhanced energy efficiency relays, wide coverage, audiovisual service production, are being investigated in the SA working group. Therefore, in the 86th plenary session of 3GPP, the enhancement of the NR Sidelink was included as a work item in the project establishment of Release 17, with the aim of enhancing the reliability of Sidelink transmissions and reducing the latency thereof.

In the enhancement of NR Sidelink, a user device A for sidelink communication can send a set of auxiliary resources to a user device B with a resource selection mode of Mode 2, which is taken into account by the user device B in resource selection for data transmission thereof. However, in the Mode 2 resource selection mechanism in the related art, there is a problem that consecutive collisions of resources selected by a plurality of terminals in a plurality of transmission periods lead to a degradation of communication reliability.

SUMMARY

The present disclosure provides a communication device, a communication device and a storage medium.

A first aspect of the present disclosure provides a communication method applied to a first user device, including:

stopping, in response to determining that a reserved resource for transmitting data is subject to a consecutive resource collision in a plurality of transmission periods, transmitting data with the reserved resource.

A second aspect of the present disclosure provides a communication method applied to a second user device, including:

transmitting, in response to determining that a reserved resource for a first user device transmitting data is subject to a consecutive resource collision in a plurality of transmission periods, a resource consecutive collision indication, where the resource consecutive collision indication is configured to indicate that the reserved resource for the first user device transmitting data is subject to the consecutive resource collision in the plurality of transmission periods.

A third aspect of the present disclosure provides a communication device applied to a first user device, including:

a processing unit configured to stop, in response to determining that a reserved resource for transmitting data is subject to a consecutive resource collision in a plurality of transmission periods, transmitting data with the reserved resource.

A fourth aspect of the present disclosure provides a communication device applied to a second user device, including:

a processing unit configured to determine that a reserved resource for a first user device transmitting data is subject to a consecutive resource collision in a plurality of transmission periods; and a transmitting unit configured to transmitting, in response to the processing unit determining that the reserved resource for the first user device transmitting data is subject to a consecutive resource collision in a plurality of transmission periods, a resource consecutive collision indication, where the resource consecutive collision indication is configured to indicate that the reserved resource for the first user device transmitting data is subject to the consecutive resource collision in the plurality of transmission periods.

A fifth aspect of the present disclosure provides a communication device, including a processor and a memory having processor-executable instructions stored thereon, where the processor is configured to perform the communication method according to the first aspect or any embodiment thereof.

A sixth aspect of the present disclosure provides a communication device, including a processor and a memory having processor-executable instructions stored thereon, where the processor is configured to perform the communication method according to the second aspect or any embodiment thereof.

A seventh aspect of the present disclosure provides a storage medium having instructions stored thereon. The instructions in the storage medium, when being executed by a processor of a first user device, cause the first user device to perform the communication method according to the first aspect or any embodiment thereof.

An eighth aspect of the present disclosure provides a storage medium having instructions stored thereon. The instructions in the storage medium, when being executed by a processor of a second user device, cause the second user device to perform the communication method according to the second aspect or any embodiment thereof.

It should be understood that the above general description and the following detailed description are merely exemplary and explanatory and do not limit the present disclosure.

BRIEF DESCRIPTION OF THE DRAWINGS

The accompanying drawings herein, which are incorporated into and form a part of the specification, illustrate embodiments consistent with the present disclosure and are used in conjunction with the specification to explain the principle of the present disclosure.

FIG. 3 illustrates a schematic diagram in which a resource is reserved in a periodic resource reservation manner according to an embodiment of the present disclosure.

FIG. 4 illustrates a schematic diagram of a consecutive resource collision according to an embodiment of the present disclosure.

FIG. 5 is a flowchart of a communication method according to an embodiment.

FIG. 6 is a flowchart of a method for determining that a reserved resource for transmitting data is subject to a consecutive resource collision in a plurality of transmission periods according to an embodiment.

FIG. 9 illustrates a schematic diagram of determining an occurrence of a consecutive resource collision according to a number of failures of first transmissions of TB and a number of failures of TB retransmissions within a second window according to an embodiment of the present disclosure.

FIG. 10 is a flowchart of a method for determining that a reserved resource for transmitting data is subject to a consecutive resource collision in a plurality of transmission periods according to an embodiment.

FIG. 12 illustrates a flowchart of a communication method according to an embodiment of the present disclosure.

FIG. 13 illustrates a schematic diagram of a process for detecting a consecutive resource collision according to an embodiment of the present disclosure.

FIG. 14 illustrates a schematic diagram of distinguishing between HARQ feedback and a consecutive resource collision indication by a cyclic shift according to an embodiment of the present disclosure.

FIG. 15 illustrates a schematic diagram of a process for determining that a reserved resource for transmitting data is subject to a consecutive resource collision in a plurality of transmission periods according to an embodiment of the present disclosure.

FIG. 16 illustrates a schematic diagram of a process for transmitting a consecutive resource collision indication according to an embodiment of the present disclosure.

FIG. 17 is a block diagram of a communication device according to an embodiment.

DETAILED DESCRIPTION

Figure 1:
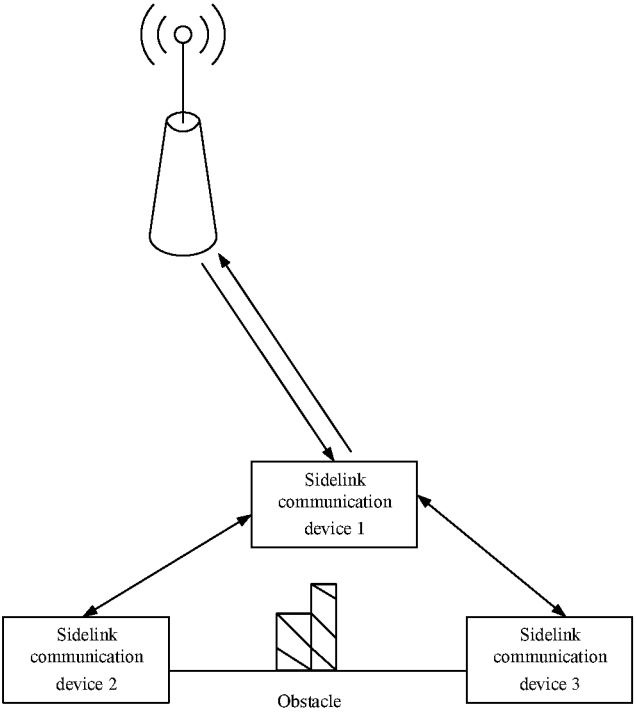
FIG. 1 is a schematic diagram of a sidelink communication system according to an embodiment.

Embodiments will be described herein in detail, examples of which are represented in the accompanying drawings. When the following description is made with reference to the accompanying drawings, the same reference numerals in different figures indicate the same or similar elements unless otherwise indicated. The implementations described in the following embodiments do not represent all implementations consistent with the present disclosure. Rather, they are only examples of devices and methods consistent with some aspects of the present disclosure as detailed in the appended claims.

The communication method provided by embodiments of the present disclosure may be applied to a sidelink communication system shown in FIG. 1. Referring to FIG. 1, in a scenario where a sidelink communication is performed between sidelink communication devices, a network device configures various transmission parameters for data transmission of a sidelink communication device 1. The sidelink communication device 1, a sidelink communication device 2, and a sidelink communication device 3 perform the sidelink communication. An obstacle may exist between the sidelink communication device 2 and the sidelink communication device 3. A communication link between the network device and the sidelink communication device is uplink and downlink, and a link between the sidelink communication device and the sidelink communication device is sidelink.

In the present disclosure, the communication scenario for sidelink communication between the sidelink communication devices may be a vehicular wireless communication technology (Vehicle to Everything, V2X) business scenario. V represents a vehicle-mounted device and X represents any object that interacts with the vehicle-mounted device. Currently, X mainly includes vehicle-mounted devices, handheld devices, traffic roadside infrastructure and network. An information mode of V2X interaction include a vehicle to vehicle (V2V) interaction, vehicle to infrastructure (V2I) interaction, vehicle to pedestrian (V2P) interaction, and vehicle to network (V2N) interaction.

With the development of next-generation 5G mobile communication technology, in 3GPP Rel-16, 5G NR technology can be used to support new V2x communication services and scenarios, such as vehicles platooning, extended sensors, advanced driving, remote driving or the like. In general, 5G V2x sidelink can provide higher communication rates, shorter communication delays, and more reliable communication quality.

The communication scenario of sidelink communication between sidelink communication devices may also be a device to device (D2D) communication scenario. The sidelink communication device for sidelink communication in embodiments of the present disclosure may include various handheld devices, vehicle-mounted devices, wearable devices, computing devices, or other processing devices connected to a wireless modem having wireless communication functions, and various forms of user equipment (UE), mobile station (MS), terminal, terminal equipment and the like. For convenience of description, embodiments of the present disclosure are hereinafter illustrated using a sidelink communication device as a user equipment as an example.

Enhancement of NR sidelink can improve transmission reliability and reduce delay. In the enhancement of NR sidelink, as for enhanced Mode 2 resource allocation, the 3GPP working group has reached a conclusion that a manner of assistance selection of resource between user devices needs to be developed. In this manner, two user devices are specified, e.g., a user device A is an assistance user device to a user device B, and the user device B is defined as a user device that needs to perform resource selection for data transmission thereof. The user device A may determine a resource set and send the same to the user device B by way of mode 2, and the user device B takes into account the resource set sent by the user device A when performing the resource selection, i.e., it can be understood that it is the user device B that uses the assistance resource set assisting mechanism to perform the resource selection. The user device B may transmit the data to the user device A and/or other user devices.

In the mode 2 resource allocation manner, the resource selection is carried out by means of resource awareness, in which the user device determines a candidate resource set by decoding sidelink control information (SCI) and measuring a demodulation reference signal (DMRS) of a physical sidelink shared channel (PSSCH). The resource for data transmission is randomly selected from the candidate resource set.

Figure 2:
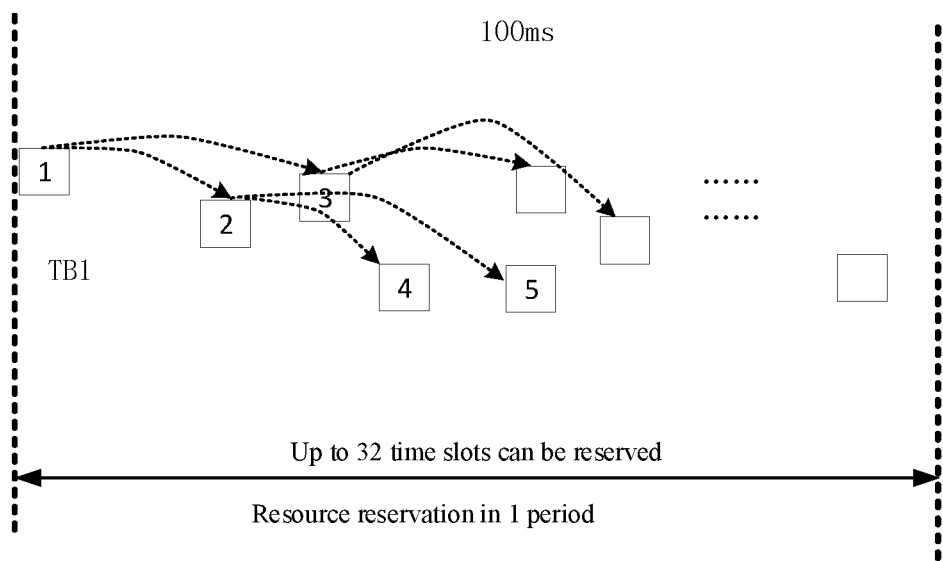
FIG. 2 illustrates a schematic diagram in which a resource is reserved in a nonperiodic resource reservation manner according to an embodiment of the present disclosure.

In the existing mode 2 resource reservation manner in the related art, there are a resource reservation manner for non-periodic services and a resource reservation manner for periodic services. FIG. 2 illustrates a schematic diagram in which a resource is reserved in a nonperiodic resource reservation manner according to an embodiment of the present disclosure. As shown in FIG. 2, for the resource reservation for non-periodic services (i.e., the resource reservation in one period), the resource for the first transmission of TB is a resource randomly selected in step 2, and when each TB is transmitted, the frequency assignment field and the time assignment field in the SCI may reserve resources for two TB retransmissions. As shown in FIG. 2, the SCI of the TB transmitted with the time-frequency resource with serial number 1 reserves time-frequency resources with serial numbers 2 and 3 for TB retransmission, and the SCI of the TB transmitted with the time-frequency resource with serial number 2 reserves the time-frequency field resources with serial numbers 4 and 5. In accordance with such principle, the reserved resources may be distributed across at most 1 to 32 time slots.

FIG. 3 illustrates a schematic diagram in which a resource is reserved in a periodic resource reservation manner according to an embodiment of the present disclosure. As shown in FIG. 3, a periodic reservation resource is used for the periodic service, and the time-frequency resource for the first transmission of TB in the second period is the time-frequency resource reserved by the SCI in the first transmission of TB in the first period.

As shown in FIG. 3, the time-frequency resource with serial number 2 is reserved by the SCI of TB transmitted at the time-frequency resource with serial number 1 in the previous period, the time-frequency resource with serial number 3 is reserved by the SCI of TB transmitted at the time-frequency resource with serial number 2 in the previous period, the SCI of TB transmitted at the time-frequency resource with serial number 1 further reserves the resource for retransmission in a period, and in accordance with this principle, the time-frequency resource for the first transmission of TB in a next period is reserved in sequence. The reserved resource in one period is reserved in accordance with the non-periodic resource reservation manner above, i.e., the resource for the first transmission of the first TB in the period is used for reserving the resource for retransmission, and the resources reserved in one period are between 1-32 time slots.

Since in step 2 of the mode 2 resource selection mechanism, the resource is randomly selected from the candidate resource set, there is a possibility that the resources which are overlapped or partially overlapped are selected for the first transmissions of data of the user device A and the user device B, thus a first collision is generated.

For the two user devices (the user device A and the user device B) that generate the first collision, they have the same data transmission period or the periods thereof have an integer multiple relation, and in the first transmissions of transport blocks (TBs) of the user device A and the user device B, sidelink control information (SCI) and data information are contained in the TB. The control information SCI reserves a time-frequency resource for transmitting a second TB in a second transmission period. Since the user device A and the user device B select the resources that are overlapped or partially overlapped in the first transmission of TB, in the second transmission period, they will simultaneously select mutually overlapping or partially overlapping resources reserved by the TB in the first transmission to transmit the second TB. Since in the second period, the user device A and the user device B again select the resources that are mutually overlapped or partially overlapped, the TB transmissions of the user device A and the user device B incur a collision in the second period as well. By analogy, the TB transmissions of the user device A and the user device B would incur a collision in the third period, such that the first collision is replicated to create a consecutive collision, which will reduce reliability.

FIG. 4 illustrates a schematic diagram of a consecutive resource collision according to an embodiment of the present disclosure. As shown in FIG. 4, the data transmission period (which can be also understood as the TB transmission period) of user device A is 100 ms, and in the first 6 periods, the user device A and the user device B select resources that are overlapped with each other, and thus a collision occurs. After the 6th period, the user device A performs a resource reselection and selects a new resource, and the new resource is not overlapped or partially overlapped with that of the user device B. Therefore, the collision no longer continues.

In view of the above, an embodiment of the present disclosure provides a communication method in which, if it is determined that a reserved resource for transmitting data may incur a consecutive resource collision in a plurality of transmission periods, a data transmission using the reserved resource for which the resource collision (in which the resources are partially overlapped or completely overlapped) occurs is stopped in advance, so as to avoid generating a consecutive resource collision.

FIG. 5 is a flowchart of a communication method according to an embodiment. As shown in FIG. 5, the communication method is applied to a first user device, and includes:

step S11, stopping, in response to determining that a reserved resource for transmitting data is subject to a consecutive resource collision in a plurality of transmission periods, transmitting data with the reserved resource.

In an embodiment of the present disclosure, the first user device may count the number of TB transmission failures after the TB transmission is performed, and according to the determined number of the TB transmission failures in different period ranges, determines whether the reserved resource for the data transmission is subject to a consecutive resource collision in the plurality of transmission periods.

In an embodiment of the present disclosure, that the reserved resource for the data transmission is subject to the consecutive resource collision may be understood as a case of at least two consecutive TB transmission failures.

In the communication method according to an embodiment of the present disclosure, if it is determined that there are at least two consecutive TB transmission failures within the plurality of transmission periods, it may be determined that the reserved resource for the data transmission is subject to the consecutive resource collision.

In the communication method according to an embodiment of the present disclosure, if it is determined that the consecutive resource collision occurs, it may stop transmitting data with the reserved resource in advance and may perform a resource reselection, so that a non-overlapping resource may be used for transmitting data in the subsequent period.

In the communication method according to an embodiment of the present disclosure, it may set a window W and a threshold of the number of TB transmission failures allowed within the window, and according to a number of TB transmission failures within the predetermined window W and the predetermined threshold of the number of transmission failures, it determines whether the reserved resource for transmitting data is subject to the consecutive resource collision in the plurality of transmission periods.

In an embodiment, if the number of TB transmission failures within the predetermined window W is greater than or equal to the predetermined threshold of the number of transmission failures, it determines that the reserved resource for transmitting data is subject to the consecutive resource collision in the plurality of transmission periods.

In another embodiment, if the number of TB transmission failures within the predetermined window W is less than the predetermined threshold of the number of transmission failures, it determines that the reserved resource for transmitting data is not subject to the consecutive resource collision in the plurality of transmission periods.

In the communication method according to an embodiment of the present disclosure, it may set a window W and determine different transmission period ranges according to the window W to determine the number of TB transmission failures. Based on the number of TB transmission failures within the predetermined window W and the predetermined threshold of the number of transmission failures, it determines whether the reserved resource for transmitting data is subject to the consecutive resource collision in the plurality of transmission periods.

In an embodiment, a window W including a plurality of transmission periods, hereinafter referred to as a first window, may be set in the communication method according to an embodiment of the present disclosure. The first window includes the plurality of transmission periods. For the first window, it may set a threshold of the number of TB transmission failures allowed in the first window, which may hereinafter be referred to as a threshold of a first number of transmission failures.

The threshold of the first number of transmission failures in an embodiment of the present disclosure may be determined according to a number of transmission periods included in the first window.

In an embodiment of the present disclosure, it may count the number of failures of first transmissions of TB in the plurality of transmission periods within the first window, which may be referred to as a first number of transmission failures. According to the first number of transmission failures and the threshold of the first number of transmission failures, it determines whether the reserved resource for transmitting data is subject to the consecutive resource collision in the plurality of transmission periods or not.

FIG. 6 is a flowchart of a method for determining that the reserved resource for transmitting data is subject to the consecutive resource collision in the plurality of transmission periods according to an embodiment. As shown in FIG. 6, the method includes the following steps.

In step S21, a first number of transmission failures is determined.

The first number of transmission failures is a number of failures of first transmissions of TB in a plurality of transmission periods within a first window. The first window includes the plurality of transmission periods.

In step S22, if the first number of transmission failures is greater than or equal to a threshold of the first number of transmission failures allowed within the first window, it determines that the reserved resource for transmitting data is subject to the consecutive resource collision in the plurality of transmission periods.

Further, in an embodiment of the present disclosure, if the first number of transmission failures is less than the threshold of the first number of transmission failures allowed within the first window, it determines that the reserved resource for transmitting data is not subject to the consecutive resource collision in the plurality of transmission periods.

In an embodiment of the present disclosure, it is assumed that the threshold of the first number of transmission failures allowed within the first window is N. N is a pre-configured set by the radio resource control (RRC) signaling and would be determined according to the number of transmission periods included in the first window. It counts the number n of negative acknowledgements (NACKs) received by the first user device for the first transmission of TB in each of the plurality of transmission periods of the first window. It may be understood that for broadcast services, it may count the number n of actions that the first user device has transmitted TB but fails to receive any feedback, as the first user device cannot receive any hybrid automatic repeat request (HARQ) feedback if the TB transmission fails in the broadcast service. In the first window, when $n \geq N$ is satisfied, which indicates that a consecutive resource collision has occurred, the first user device may stop the transmission in advance, and thus does not use the periodically reserved resource to transmit the TB any longer.

Moreover, if it determines that the consecutive resource collision has occurred, it may stop transmitting data with the reserved resource in advance and perform a resource reselection.

Figure 7:
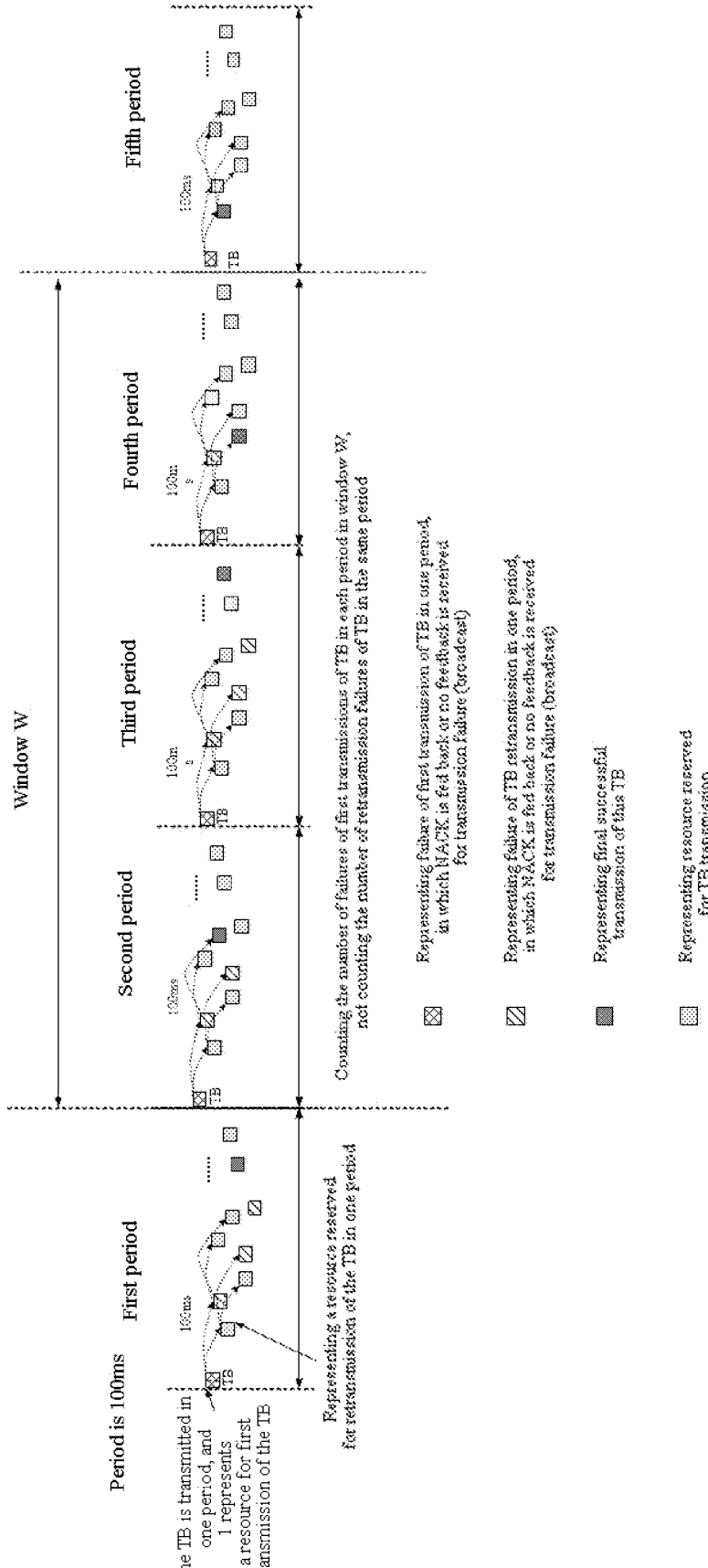
FIG. 7 illustrates a schematic diagram of determining an occurrence of a consecutive resource collision according to a number of failures of first transmissions of TB within a first window according to an embodiment of the present disclosure.

FIG. 7 illustrates a schematic diagram of determining an occurrence of a consecutive resource collision according to a number of failures of first transmissions of TB within a first window according to an embodiment of the present disclosure. Referring to FIG. 7, a same transmission period includes a TB with the first transmission failure, and the TB with the first transmission failure may be a TB for which a NACK has been received for the first transmission, or a TB for which no feedback has been received for the first transmission in a broadcast situation. The transmission period also includes a TB with a retransmission failure and a TB with a transmission success, as well as the transmission resources reserved for the TB. The TB with the retransmission failure may also be understood as a TB for which a NACK has been received for the TB retransmission, or a TB for which no feedback has been received for the TB retransmission in the broadcast situation. In FIG. 7, it may count the number of failures of first transmissions of TB in each period within the entire window W without counting the number of failures of TB retransmissions in the same period in an embodiment of the present disclosure.

In an embodiment, a window W including one transmission period, hereinafter referred to as a second window, may be set in the communication method according to an embodiment of the present disclosure. The second window includes one transmission period. For the second window, it may set a threshold of the number of TB transmission failures allowed in the second window, which may hereinafter be referred to as a threshold of a second number of transmission failures.

The threshold of the second number of transmission failures in an embodiment of the present disclosure may be determined according to a number of transmission periods included in the second window.

In an embodiment of the present disclosure, it may count the number of failures of TB transmissions in the second window. The number of failures of TB transmissions in the second window includes a number of failures of first transmissions of TB and a number of failures of retransmissions of TB in the transmission period included in the second window. In an embodiment of the present disclosure, the number of failures of TB transmissions in the second window would be referred to as a second number of transmission failures below. The second number of transmission failures may be understood to be a sum of a number of failures of first transmissions of TB and a number of failures of retransmissions of TB in the transmission period included in a second window.

In an embodiment of the present disclosure, it may determine, according to the second number of transmission failures and a threshold of the second number of transmission failures, whether the reserved resource for transmitting data is subject to the consecutive resource collision in the plurality of transmission periods or not.

Figure 8:
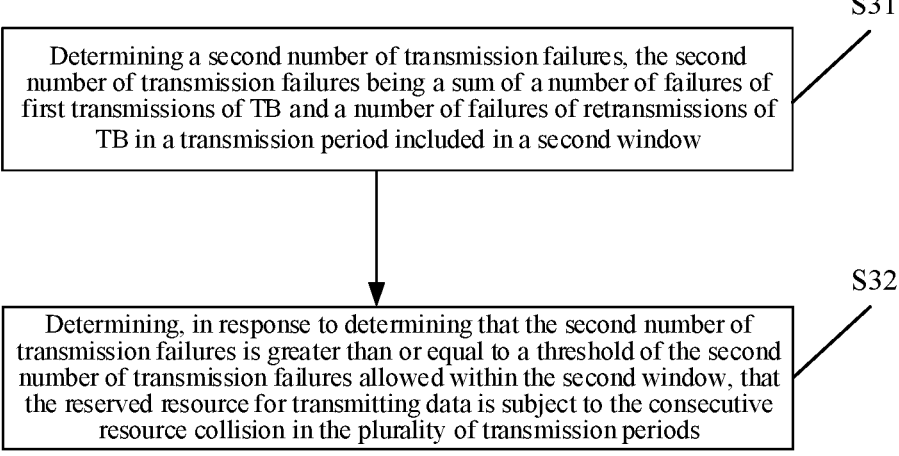
FIG. 8 is a flowchart of a method for determining that a reserved resource for transmitting data is subject to a consecutive resource collision in a plurality of transmission periods according to an embodiment.

FIG. 8 is a flowchart of a method for determining that a reserved resource for transmitting data is subject to a consecutive resource collision in a plurality of transmission periods according to an embodiment. As shown in FIG. 8, the method includes the following steps.

In step S31, a second number of transmission failures is determined.

The second number of transmission failures is a sum of a number of failures of first transmissions of TB and a number of failures of retransmissions of TB in a transmission period included in a second window, and the second window incudes one transmission period.

In step S32, if the second number of transmission failures is greater than or equal to a threshold of the second number of transmission failures allowed within the second window, it determines that the reserved resource for transmitting data is subject to the consecutive resource collision in the plurality of transmission periods.

In an embodiment of the present disclosure, it is assumed that the threshold of the second number of transmission failures allowed within the second window is N. N is a pre-configured set by the RRC signaling and would be determined according to the number of transmission periods included in the second window. It counts the number n of NACKs received by the first user device for the first transmission of TB and the retransmission of TB in the one transmission periods of the second window. It may be understood that for broadcast services, it may count the number n of actions that the first user device has transmitted TB but fails to receive any feedback, as the first user device cannot receive any HARQ feedback if the TB transmission fails in the broadcast service. In the second window, when nN is satisfied, which indicates that a consecutive resource collision has occurred, the first user device may stop transmission in advance, and thus does not use the periodically reserved resource to transmit the TB any longer.

Moreover, if it determines that the consecutive resource collision has occurred, it may stop transmitting data with the reserved resource in advance and perform a resource reselection.

FIG. 9 illustrates a schematic diagram of determining an occurrence of a consecutive resource collision according to a number of failures of first transmissions of TB and a number of failures of retransmissions of TB within a second window according to an embodiment of the present disclosure. Referring to FIG. 9, a same transmission period includes a TB with the first transmission failure, and the TB with the first transmission failure may be a TB for which a NACK has been received for the first transmission, or a TB for which no feedback has been received for the first transmission in a broadcast situation. The transmission period also includes a TB with a retransmission failure and a TB with a transmission success, as well as the transmission resources reserved for the TB. The TB with the retransmission failure may also be understood as a TB for which a NACK has been received for the TB retransmission, or a TB for which no feedback has been received for the TB retransmission in the broadcast situation. In FIG. 9, it may count the number of failures of first transmissions of TB and the number of failures of retransmissions of TB within the entire window W in an embodiment of the present disclosure. It determines whether a consecutive resource collision has occurred according to a comparison of a sum of a number of failures of first transmissions of TB and a number of failures of retransmissions of TB within the entire window W with the threshold N of the second number of transmission failures. If it determines that the consecutive resource collision has occurred, it may stop transmitting data with the reserved resource in advance and perform a resource reselection.

Further, in an embodiment of the present disclosure, if it determines that the second number of transmission failures is less than the threshold of the second number of transmission failures allowed within the second window, it determines that the reserved resource for transmitting data is not subject to the consecutive resource collision in the plurality of transmission periods.

In an embodiment, another window W including a plurality of transmission periods, hereinafter referred to as a third window, may be set in the communication method according to an embodiment of the present disclosure. The third window includes a plurality of transmission periods. For the third window, it may set a threshold of the number of TB transmission failures allowed in the third window, which may hereinafter be referred to as a threshold of a third number of transmission failures.

The threshold of the third number of transmission failures in an embodiment of the present disclosure may be determined according to a number of transmission periods included in the third window.

In an embodiment of the present disclosure, it may count the number of failures of TB transmissions in each of the plurality of transmission periods included in the third window, which may be understood as the number of failures of TB transmissions within the third window. The number of failures of TB transmissions in the third window includes a sum of a number of failures of first transmissions of TB and a number of failures of retransmissions of TB in each of the plurality of transmission periods included in the third window. In an embodiment of the present disclosure, the number of failures of TB transmissions in the third window would be referred to as a third number of transmission failures below. The third number of transmission failures may be understood to be a sum of the number of failures of first transmissions of TB and the number of failures of retransmissions of TB in each of the plurality of transmission periods included in the third window.

In an embodiment of the present disclosure, it may determine, according to the third number of transmission failures and a threshold of the third number of transmission failures, whether the reserved resource for transmitting data is subject to the consecutive resource collision in the plurality of transmission periods or not.

FIG. 10 is a flowchart of a method for determining that a reserved resource for transmitting data is subject to a consecutive resource collision in a plurality of transmission periods according to an embodiment. As shown in FIG. 10, the method includes the following steps.

In step S41, a third number of transmission failures is determined.

The third number of transmission failures is a sum of a number of failures of first transmissions of TB and a number of failures of retransmissions of TB in each of a plurality of transmission periods included in a third window, and the third window comprising the plurality of transmission periods.

In step S42, if the third number of transmission failures is greater than or equal to a threshold of the third number of transmission failures allowed within the third window, determining, it determines that the reserved resource for transmitting data is subject to the consecutive resource collision in the plurality of transmission periods.

In an embodiment of the present disclosure, it is assumed that the threshold of the third number of transmission failures allowed within the third window is N. N is a pre-configured set by the RRC signaling and would be determined according to the number of transmission periods included in the third window. It counts the number n of NACKs received by the first user device for the first transmission of TB and the retransmission of TB in the plurality of transmission periods included in the third window. In an embodiment of the present disclosure, the number of TB transmission failures within the third window may be understood to be as the sum of the number of NACKs that the first user device has received for the transmission of the same TB in the third window and the number of NACKs that the first user device has received for transmissions of different TBs in the plurality of transmission periods. It may be understood that for broadcast services, it may count the number n of actions that the first user device has transmitted TB but fails to receive any feedback, as the first user device cannot receive any HARQ feedback if the TB transmission fails in the broadcast service. In the third window, when nN is satisfied, which indicates that a consecutive resource collision has occurred, the first user device may stop the transmission in advance, and thus does not use the periodically reserved resource to transmit the TB any longer.

Moreover, if it determines that the consecutive resource collision has occurred, it may stop transmitting data with the reserved resource in advance and perform a resource reselection.

Figure 11:
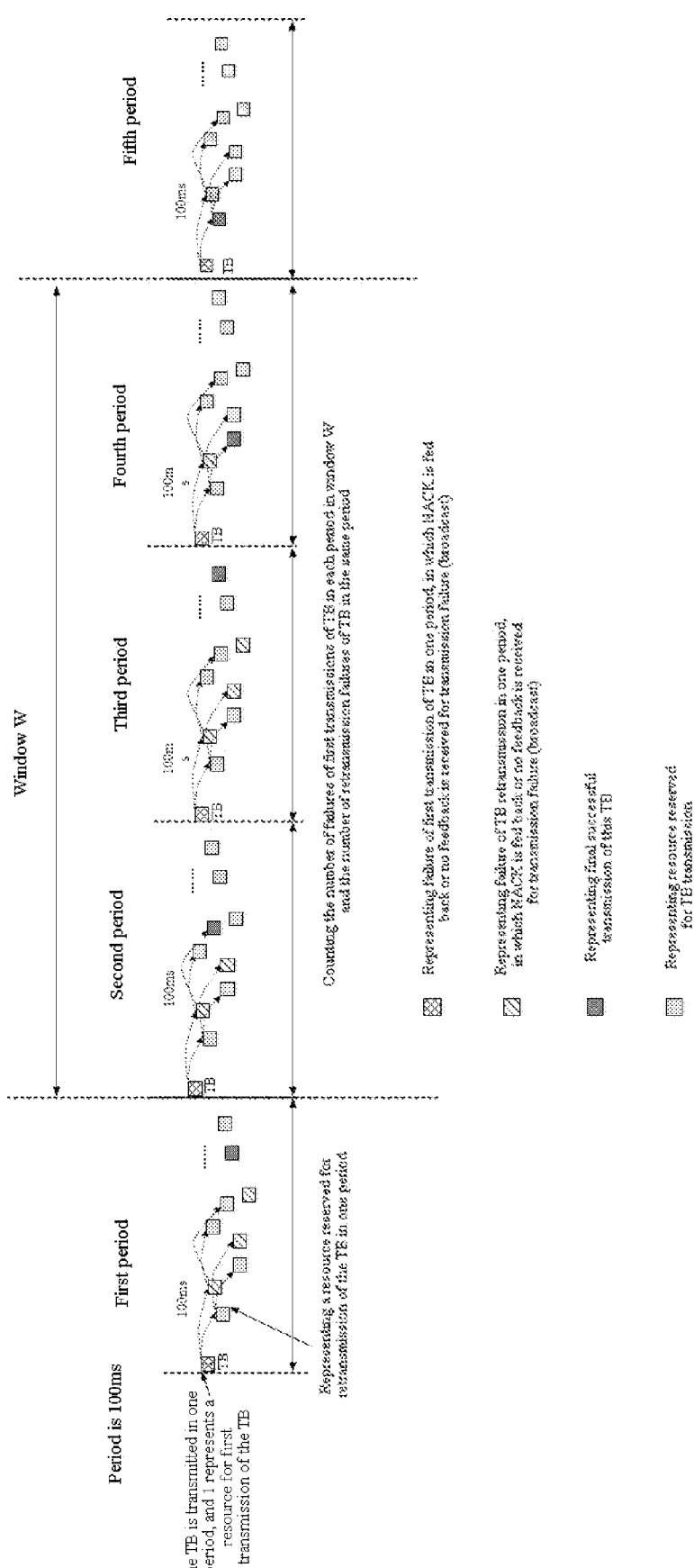
FIG. 11 illustrates a schematic diagram of determining the occurrence of a consecutive resource collision according to a number of transmission failures of a same TB within a third window and a number of failures of TB retransmissions in a plurality of transmission periods according to an embodiment of the present disclosure.

FIG. 11 illustrates a schematic diagram of determining the occurrence of a consecutive resource collision according to a number of transmission failures of a same TB within a third window and a number of failures of TB retransmissions in a plurality of transmission periods according to an embodiment of the present disclosure. Referring to FIG. 11, a same transmission period includes a TB with the first transmission failure, and the TB with the first transmission failure may be a TB for which a NACK has been received for the first transmission, or a TB for which no feedback has been received for the first transmission in a broadcast situation. The transmission period also includes a TB with a retransmission failure and a TB with a transmission success, as well as the transmission resources reserved for the TB. The TB with the retransmission failure may also be understood as a TB for which a NACK has been received for the TB retransmission, or a TB for which no feedback has been received for the TB retransmission in the broadcast situation. In FIG. 11, it may count the sum of the number of failures of first transmissions of TB and the number of failures of retransmissions of TB in each of the plurality of transmission periods within the entire window W in an embodiment of the present disclosure. It determines whether a consecutive resource collision has occurred according to a comparison of the sum of the number of failures of first transmissions of TB and the number of failures of retransmissions of TB within the entire window W with the threshold N of the third number of transmission failures. If it determines that the consecutive resource collision has occurred, it may stop transmitting data with the reserved resource in advance and perform a resource reselection.

Further, in an embodiment of the present disclosure, if it determines that the third number of transmission failures is less than the threshold of the third number of transmission failures allowed within the third window, it determines that the reserved resource for transmitting data is not subject to the consecutive resource collision in the plurality of transmission periods.

In another embodiment of the present disclosure, based on an inter-user device (inter-UE) assistance mechanism, a second user device different from the first user device may detect whether the first user device has selected a resource that is overlapped or partially overlapped with that of another user device. In other words, the second user device may detect whether the reserved resource for the first user device transmitting data is subject to a consecutive resource collision in a plurality of transmission periods.

FIG. 12 illustrates a flowchart of a communication method according to an embodiment of the present disclosure. Referring to FIG. 12, the communication method is applied to a second user device, and includes:

step S51, transmitting, in response to determining that a reserved resource for a first user device transmitting data is subject to a consecutive resource collision in a plurality of transmission periods, a resource consecutive collision indication.

The resource consecutive collision indication is configured to indicate that the reserved resource for the first user device transmitting data is subject to the consecutive resource collision in the plurality of transmission periods.

In an embodiment, the second user device may determine whether a resource collision has occurred by detecting a received signal strength indication (RSSI) value on a subchannel. For example, if the RSSI value on the subchannel exceeds a signal strength threshold, it determines that the resource collision has occurred. Further, in an embodiment of the present disclosure, the second user device may determine whether the resource reservation period values of the first user device and an other user device (a third user device) are equal to each other by decoding 1st SCIs of the first user device and the other user device, in order to determine whether or not the reserved resource for the first user device transmitting data will incur the consecutive resource collision in the plurality of transmission periods. In an embodiment of the present disclosure, according to determining that the resource collision has occurred according to the RSSI value on the subchannel exceeding the signal strength threshold and determining that the resource reservation period value of the first user device is equal to the resource reservation period value of the other user device, the second user device determines that the reserved resource for the first user device transmitting data will incur the consecutive resource collision in the plurality of transmission periods. It is to be understood that in an embodiment of the present disclosure, the resource reservation period values of the first user device and the other user device are equal to each, which may mean that information fields of the reservation periods are the same or have an integer multiple relation.

In an embodiment of the present disclosure, in the case where the second user device determines that the consecutive resource collision is about to occur in the first user device, the second user device sends the consecutive resource collision indication to the first user device to enable the first user device to stop the consecutive collision at an earlier time without having to wait for the feedback of N NACKs to improve the reliability of the communication.

FIG. 13 illustrates a schematic diagram of a process for detecting a consecutive resource collision according to an embodiment of the present disclosure. Referring to FIG. 13, UEC (a second user device) detects that a collision has occurred by detecting an RSSI value on a subchannel, and finds that information fields of reservation periods of UEA (a first user device) and UEB (a third user device) are the same or have an integer multiple relation by decoding 1st SCIs of the UEA and the UEB. When the above two conditions are met, a consecutive collision is predicted to occur. The UEC starts transmitting a consecutive resource collision indication of one bit to one of the user devices, such as the UEA.

In an embodiment, the second user device may transmit the resource consecutive collision indication by multiplexing a physical sidelink feedback channel (PSFCH) resource.

The resource consecutive collision indication and the HARQ feedback multiplex the PSFCH resource, therefore, it needs to distinguish between the resource consecutive collision indication and the HARQ feedback.

In an embodiment, a cycle shift (CS) manner may be used to distinguish the resource consecutive collision indication and the HARQ feedback. For example, the PSFCH resource is multiplexed to transmit a base sequence, and the resource consecutive collision indication and the HARQ feedback are distinguished from each other according to different cycle shift values of the base sequence.

In an embodiment of the present disclosure, the PSFCH resource with a same time-frequency domain is used to transmit a base sequence with a length of 12, and the base sequence may carry transmitted information after cycle shift. For example, the sequence is mapped on a single physical resource block (PRB) and a single orthogonal frequency division multiplexing (OFDM) symbol, i.e., a 1-bit consecutive resource collision indication and 1-bit HARQ feedback. FIG. 14 illustrates a schematic diagram of distinguishing between the HARQ feedback and the consecutive resource collision indication by CS according to an embodiment of the present disclosure. As shown in FIG. 14, there are 4 cycle shifts which are rotated in a unit of π/2. A phase of 0 indicates (N, +collision), which means NACK feedback and occurrence of consecutive resource collision. A phase of π/2 indicates (N, −collision), which means NACK feedback and occurrence of no consecutive resource collision. A phase of 7C indicates (ACK, +collision), which means ACK feedback and occurrence of consecutive resource collision. A phase of 3π/2 indicates (ACK, −collision), which means ACK feedback and occurrence of no consecutive resource collision.

In an embodiment of the present disclosure, if the first user device receives the resource consecutive collision indication transmitted by the second user device, the first user device may determine that the reserved resource for transmitting data will be subject to a consecutive resource collision in a plurality of transmission periods.

FIG. 15 illustrates a schematic diagram of a process for determining that a reserved resource for transmitting data is subject to a consecutive resource collision in a plurality of transmission periods according to an embodiment of the present disclosure. Referring to FIG. 15, the process is applied to the first user device, and includes the following steps:

step S61, determining, in response to receiving a resource consecutive collision indication from a second user device, that the reserved resource for transmitting data is subject to the consecutive resource collision in the plurality of transmission periods.

The resource consecutive collision indication is configured to indicate that the reserved resource for the first user device transmitting data is subject to the consecutive resource collision in the plurality of transmission periods.

FIG. 16 illustrates a schematic diagram of a process for transmitting a consecutive resource collision indication according to an embodiment of the present disclosure. Referring to FIG. 16, the process is applied to the first user device and includes the following steps:

step S71, receiving the resource consecutive collision indication from the second user device by multiplexing a PSFCH resource.

In an embodiment, the resource consecutive collision indication and the HARQ feedback multiplex the PSFCH resource, therefore, it needs to distinguish between the resource consecutive collision indication and the HARQ feedback.

In an embodiment, a cycle shift (CS) manner may be used to distinguish the resource consecutive collision indication and the HARQ feedback. For example, the PSFCH resource with the same time-frequency domain is used to receive a base sequence, and the resource consecutive collision indication and the HARQ feedback are distinguished from each other according to different cycle shift values of the base sequence.

In an embodiment of the present disclosure, the way in which the first user device distinguishes between the resource consecutive collision indication and the HARQ feedback based on the CS manner may be similar to the way shown in FIG. 14, which is not described in detail in the embodiment of the present disclosure.

In an embodiment of the present disclosure, the first user device receives the consecutive resource collision indication from the second user device, which may enable the first user device to stop the consecutive collision at an earlier time without having to wait for the feedback of N NACKs to improve the reliability of the communication.

In the communication method provided above in the embodiment of the present disclosure, in an implementation, a window W is designed, a number N of transmission failures within the window is counted, i.e., a number n of NACKs received by a first user device for a first transmission of TB is counted, and for a broadcast service, the number n of actions that the first user device has transmitted TB but fails to receive any feedback may be counted. When nN is satisfied, which indicates that the consecutive resource collision has occurred, the first user device may stop the transmission in advance, and thus does not use the periodically reserved resource to transmit the TB any longer, but performs a resource reselection. N is a pre-configured set by RRC and would be determined according to the number of transmission periods included in the window W.

In the communication method provided above in the embodiment of the present disclosure, in another implementation, a second user device transmits a resource consecutive collision indication to a first user device by multiplexing a PSFCH resource, and the first user device stops the transmission in advance after receiving the resource consecutive collision indication. The first user device does not use the periodically reserved resource to transmit TB any longer but performs a resource reselection. This may improve the communication reliability.

It may be understood that the communication method provided by the embodiment of the present disclosure is applicable to the interaction process between the first user device and the second user device to avoid the consecutive resource collision. Details of the interaction process between the first user device and the second user device are not described in detail in the embodiments of the present disclosure.

It is to be noted that those skilled in the art may understand that various implementations/embodiments involved above in the embodiments of the present disclosure may be used in conjunction with the foregoing embodiments or may be used independently. No matter whether they are used in conjunction with the foregoing embodiments or independently, the implementation principles thereof are similar. Some of the embodiments of the present disclosure are illustrated in a manner that they are used together; of course, those skilled in the art may understand that such illustrations are not a limitation of the embodiments of the present disclosure.

Based on the same concept, an embodiment of the present disclosure also provides a communication device.

It may be understood that the communication device provided in the embodiment of the present disclosure includes a hardware structure and/or a software module for implement a corresponding function in order to achieve the above-described function. In combination with various illustrated units and algorithmic steps disclosed in the embodiments of the present disclosure, the embodiment of the present disclosure can be implemented in the form of hardware or a combination of hardware and computer software. Whether a particular function is achieved by a hardware or a manner of a computer software driving a hardware depends on the particular application and design constraint of the technical solution. Those skilled in the art may use a different method for each particular application to implement the described function, but such implementation should not be considered as going beyond the scope of the technical solution in the embodiments of the present disclosure.

FIG. 17 is a block diagram of a communication device according to an embodiment. Referring to FIG. 17, the communication device 100 is applied to a first user device and includes a processing unit 101.

The processing unit 101 is configured to stop, in response to determining that a reserved resource for transmitting data is subject to a consecutive resource collision in a plurality of transmission periods, transmitting data with the reserved resource.

In an embodiment, the processing unit 101 is configured to determine, according to a number of transmission failures of a TB within a predetermined window and a predetermined threshold of the number of transmission failures, that the reserved resource for transmitting data is subject to the consecutive resource collision in the plurality of transmission periods.

In an embodiment, the processing unit 101 is configured to: determine a first number of transmission failures, the first number of transmission failures being a number of failures of first transmissions of the TB in a first plurality of transmission periods within a first window, and the first window including the first plurality of transmission periods; and determine, in response to determining that the first number of transmission failures is greater than or equal to a threshold of the first number of transmission failures allowed within the first window, that the reserved resource for transmitting data is subject to the consecutive resource collision in the plurality of transmission periods.

In an embodiment, the processing unit 101 is configured to: determine a second number of transmission failures, the second number of transmission failures being a sum of a number of failures of first transmissions of the TB and a number of failures of retransmissions of the TB in a transmission period included in a second window, and the second window including one transmission period; and determine, in response to determining that the second number of transmission failures is greater than or equal to a threshold of the second number of transmission failures allowed within the second window, that the reserved resource for transmitting data is subject to the consecutive resource collision in the plurality of transmission periods.

In an embodiment, the processing unit 101 is configured to: determine a third number of transmission failures, the third number of transmission failures being a sum of a number of failures of first transmissions of the TB and a number of failures of retransmissions of the TB in each of a third plurality of transmission periods included in a third window, and the third window including the third plurality of transmission periods; and determine, in response to determining that the third number of transmission failures is greater than or equal to a threshold of the third number of transmission failures allowed within the third window, that the reserved resource for transmitting data is subject to the consecutive resource collision in the plurality of transmission periods.

In an embodiment, the communication device further includes a receiving unit 102 configured to receive a resource consecutive collision indication from a second user device. The processing unit 101 is configured to determine, in response to receiving the resource consecutive collision indication from the second user device, that the reserved resource for transmitting data is subject to the consecutive resource collision in the plurality of transmission periods. The resource consecutive collision indication is configured to indicate that the reserved resource for the first user device transmitting data is subject to the consecutive resource collision in the plurality of transmission periods.

In an embodiment, the receiving unit 102 is configured to receive the resource consecutive collision indication from the second user device by multiplexing a PSFCH resource.

In an embodiment, the receiving unit 102 is configured to receive a base sequence by using the PSFCH with a same time-frequency domain, and distinguish between a HARQ feedback and the resource consecutive collision indication according to different cyclic shift values of the base sequence.

In an embodiment, the processing unit 101 is further configured to perform a resource reselection after stopping transmitting data with the reserved resource.

Figure 18:
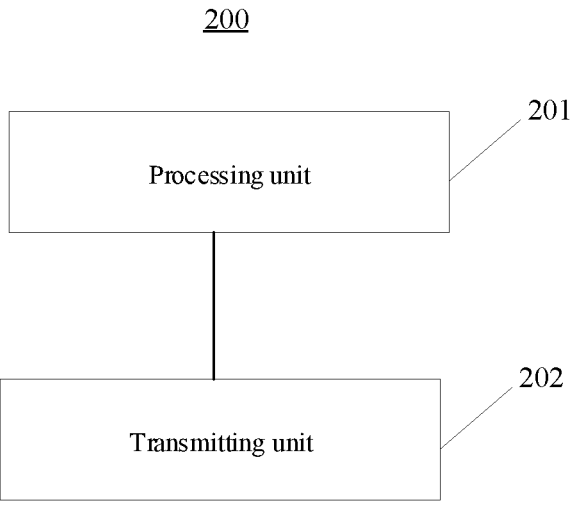
FIG. 18 is a block diagram of a communication device according to an embodiment.

FIG. 18 is a block diagram of a communication device according to an embodiment. Referring to FIG. 18, the communication device 200 is applied to a first user device and includes a processing unit 201 and a transmitting unit 202.

The processing unit 201 is configured to determine that a reserved resource for a first user device transmitting data is subject to a consecutive resource collision in a plurality of transmission periods; and The transmitting unit 202 is configured to transmitting, in response to the processing unit 201 determining that the reserved resource for the first user device transmitting data is subject to a consecutive resource collision in a plurality of transmission periods, a resource consecutive collision indication, wherein the resource consecutive collision indication is configured to indicate that the reserved resource for the first user device transmitting data is subject to the consecutive resource collision in the plurality of transmission periods.

In an embodiment, the processing unit 201 is configured to: determine, in response to determining that a resource collision has occurred according to a RSSI value on a sub-channel exceeding a signal strength threshold and determining that a value of a resource reservation period of the first user device is equal to a value of a resource reservation period of an other user device, that the reserved resource for the first user device transmitting data is subject to the consecutive resource collision in the plurality of transmission periods.

In an embodiment, the transmitting unit 202 is configured to transmit the resource consecutive collision indication by multiplexing a PSFCH resource.

In an embodiment, the transmitting unit 202 is configured to transmit a base sequence by using the PSFCH resource with a same time-frequency domain, and distinguish between a HARQ feedback and the resource consecutive collision indication according to different cyclic shift values of the base sequence.

With regard to the device in the above embodiment, the specific manner in which the respective modules perform their operations has been described in detail in the embodiment concerning the method and will not be described in detail here.

Figure 19:
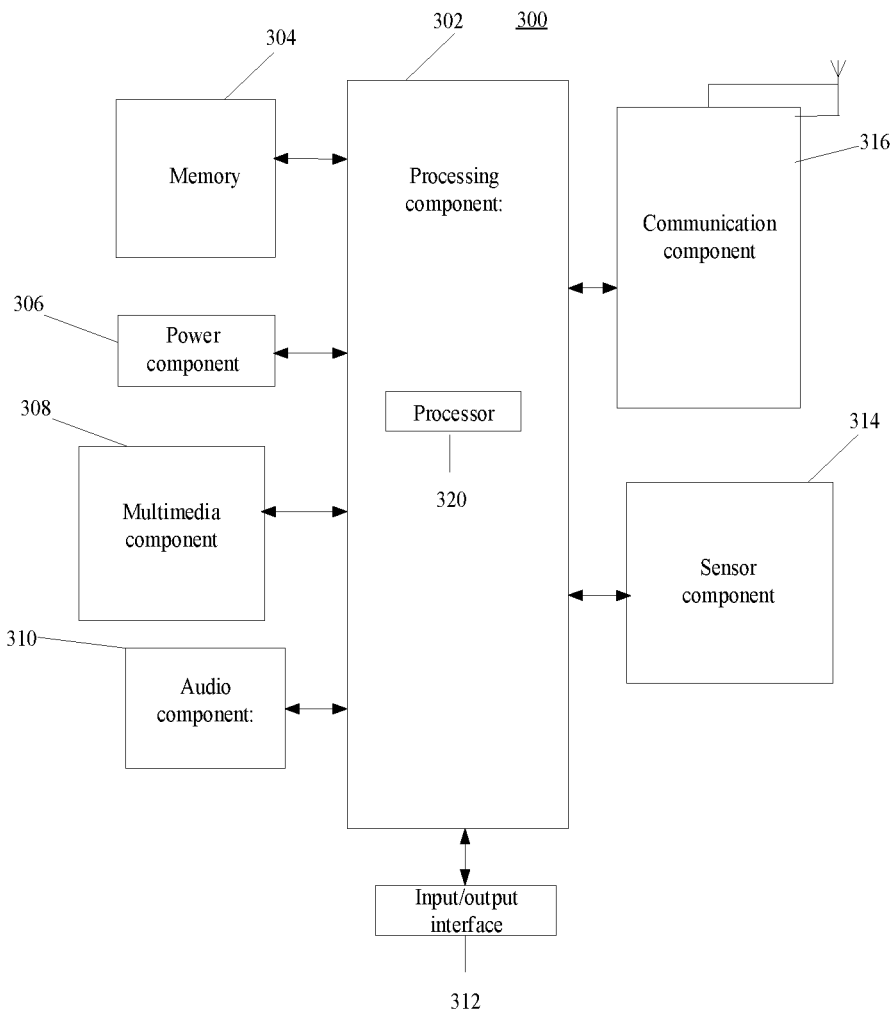
FIG. 19 is a block diagram of a communication device according to an embodiment.

FIG. 19 is a block diagram of a communication device 300 according to an embodiment. For example, the device 300 may be the first or second user device in the above embodiments, for example, it may be a mobile phone, a computer, a digital broadcasting terminal, a messaging device, a game console, a tablet device, a medical device, a fitness device, a personal digital assistant, or the like.

Referring to FIG. 19, the device 300 may include one or more of a processing component 302, a memory 304, a power component 306, a multimedia component 308, an audio component 310, an input/output (I/O) interface 312, a sensor component 314, and a communication component 316.

The processing component 302 generally controls the overall operations of the device 300, such as operations associated with display, telephone calls, data communications, camera operations, and recording operations. The processing component 302 may include one or more processors 320 to execute instructions to complete all or part of the steps of the foregoing method. In addition, the processing component 302 may include one or more modules to facilitate interaction between the processing component 302 and other components. For example, the processing component 302 may include a multimedia module to facilitate the interaction between the multimedia component 308 and the processing component 302.

The memory 304 is configured to store various types of data to support the operation at the device 300. Examples of these data include instructions for any application or method operating on the device 300, contact data, phone book data, messages, pictures, videos and the like. The memory 304 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 306 provides power to various components of the device 300. The power component 306 may include a power management system, one or more power supplies, and other components associated with generating, managing, and distributing power for the device 300.

The multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 308 includes a front camera and/or a rear camera. When the device 300 is in an operation mode, such as a shooting mode or a video mode, the front camera and/or the rear camera can receive external multimedia data. Each front camera and rear camera may be a fixed optical lens system or have focal length and optical zoom capabilities.

The audio component 310 is configured to output and/or input audio signals. For example, the audio component 310 includes a microphone (MIC), and when the device 300 is in an operation mode, such as a call mode, a recording mode, and a voice recognition mode, the microphone is configured to receive an external audio signal. The received audio signal can be further stored in the memory 304 or sent via the communication component 316. In some embodiments, the audio component 310 further includes a speaker for outputting audio signals.

The I/O interface 312 provides an interface between the processing component 302 and a peripheral interface module. The above-mentioned peripheral interface module may be a keyboard, a click wheel, a button, and the like. These buttons may include but are not limited to home button, volume button, start button, and lock button.

The sensor component 314 includes one or more sensors for providing the device 300 with various aspects of state evaluation. For example, the sensor component 314 can detect the on/off status of the device 300 and the relative positioning of components. For example, the component is a display and keypad of the device 300. The sensor component 314 can also detect the position change of the device 300 or a component of the device 300, the presence or absence of contact between the user and the device 300, the orientation or acceleration/deceleration of the device 300, and the temperature change of the device 300. The sensor component 314 may include a proximity sensor configured to detect the presence of nearby objects when there is no physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as WiFi, 2G, or 3G, or a combination thereof. In an embodiment, the communication component 316 receives a broadcast signal or broadcast related information from an external broadcast management system via a broadcast channel. In an embodiment, the communication component 316 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 300 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 304 including instructions, and the instructions may be executed by the processor 320 of the device 300 to complete the foregoing method. For example, the non-transitory computer-readable storage medium may be ROM, random access memory (RAM), CD-ROM, magnetic tape, floppy disk, optical data storage device and the like.

One aspect of the present disclosure provides a communication method applied to a first user device, including:

stopping, in response to determining that a reserved resource for transmitting data is subject to a consecutive resource collision in a plurality of transmission periods, transmitting data with the reserved resource.

In an embodiment, determining that the reserved resource for transmitting data is subject to the consecutive resource collision in the plurality of transmission periods includes:

determining, according to a number of transmission failures of a transmission block within a predetermined window and a predetermined threshold of the number of transmission failures, that the reserved resource for transmitting data is subject to the consecutive resource collision in the plurality of transmission periods.

In an embodiment, determining, according to the number of transmission failures of the transmission block within the predetermined window and the predetermined threshold of the number of transmission failures, that the reserved resource for transmitting data is subject to the consecutive resource collision in the plurality of transmission periods includes:

determining a first number of transmission failures, the first number of transmission failures being a number of failures of first transmissions of the transmission block in a first plurality of transmission periods within a first window, and the first window including the first plurality of transmission periods; and determining, in response to determining that the first number of transmission failures is greater than or equal to a threshold of the first number of transmission failures allowed within the first window, that the reserved resource for transmitting data is subject to the consecutive resource collision in the plurality of transmission periods.

In an embodiment, determining, according to the number of transmission failures of the transmission block within the predetermined window and the predetermined threshold of the number of transmission failures, that the reserved resource for transmitting data is subject to the consecutive resource collision in the plurality of transmission periods includes:

determining a second number of transmission failures, the second number of transmission failures being a sum of a number of failures of first transmissions of the transmission block and a number of failures of retransmissions of the transmission block in a transmission period included in a second window, and the second window including one transmission period; and determining, in response to determining that the second number of transmission failures is greater than or equal to a threshold of the second number of transmission failures allowed within the second window, that the reserved resource for transmitting data is subject to the consecutive resource collision in the plurality of transmission periods.

In an embodiment, determining, according to the number of transmission failures of the transmission block within the predetermined window and the predetermined threshold of the number of transmission failures, that the reserved resource for transmitting data is subject to the consecutive resource collision in the plurality of transmission periods includes:

determining a third number of transmission failures, the third number of transmission failures being a sum of a number of failures of first transmissions of the transmission block and a number of failures of retransmissions of the transmission block in each of a third plurality of transmission periods included in a third window, and the third window including the third plurality of transmission periods; and determining, in response to determining that the third number of transmission failures is greater than or equal to a threshold of the third number of transmission failures allowed within the third window, that the reserved resource for transmitting data is subject to the consecutive resource collision in the plurality of transmission periods.

In an embodiment, determining that the reserved resource for transmitting data is subject to the consecutive resource collision in the plurality of transmission periods includes:

determining, in response to receiving a resource consecutive collision indication from a second user device, that the reserved resource for transmitting data is subject to the consecutive resource collision in the plurality of transmission periods, where the resource consecutive collision indication is configured to indicate that the reserved resource for the first user device transmitting data is subject to the consecutive resource collision in the plurality of transmission periods.

In an embodiment, the resource consecutive collision indication is received from the second user device by multiplexing a physical sidelink feedback channel resource.

In an embodiment, receiving the resource consecutive collision indication from the second user device by multiplexing the physical sidelink feedback channel resource includes:

receiving a base sequence by using the physical sidelink feedback channel resource with a same time-frequency domain, and distinguishing between a hybrid automatic retransmission request feedback and the resource consecutive collision indication according to different cyclic shift values of the base sequence.

In an embodiment, the communication method further includes, after stopping transmitting data with the reserved resource: performing a resource reselection.

Another aspect of the present disclosure provides a communication method applied to a second user device, including:

transmitting, in response to determining that a reserved resource for a first user device transmitting data is subject to a consecutive resource collision in a plurality of transmission periods, a resource consecutive collision indication, where the resource consecutive collision indication is configured to indicate that the reserved resource for the first user device transmitting data is subject to the consecutive resource collision in the plurality of transmission periods.

In an embodiment, determining that the reserved resource for the first user device transmitting data is subject to the consecutive resource collision in the plurality of transmission periods includes:

determining, in response to determining that a resource collision has occurred according to a received signal strength value on a sub-channel exceeding a signal strength threshold and determining that a value of a resource reservation period of the first user device is equal to a value of a resource reservation period of an other user device, that the reserved resource for the first user device transmitting data is subject to the consecutive resource collision in the plurality of transmission periods.

In an embodiment, transmitting the resource consecutive collision indication includes:

transmitting the resource consecutive collision indication by multiplexing a physical sidelink feedback channel resource.

In an embodiment, transmitting the resource consecutive collision indication by multiplexing the physical sidelink feedback channel resource includes:

transmitting a base sequence by using the physical sidelink feedback channel resource with a same time-frequency domain, and distinguishing between a hybrid automatic retransmission request feedback and the resource consecutive collision indication according to different cyclic shift values of the base sequence.

Another aspect of the present disclosure provides a communication device applied to a first user device, including:

a processing unit configured to stop, in response to determining that a reserved resource for transmitting data is subject to a consecutive resource collision in a plurality of transmission periods, transmitting data with the reserved resource.

In an embodiment, the processing unit is configured to determine, according to a number of transmission failures of a transmission block within a predetermined window and a predetermined threshold of the number of transmission failures, that the reserved resource for transmitting data is subject to the consecutive resource collision in the plurality of transmission periods.

In an embodiment, the processing unit is configured to: determine a first number of transmission failures, the first number of transmission failures being a number of failures of first transmissions of the transmission block in a first plurality of transmission periods within a first window, and the first window including the first plurality of transmission periods; and determine, in response to determining that the first number of transmission failures is greater than or equal to a threshold of the first number of transmission failures allowed within the first window, that the reserved resource for transmitting data is subject to the consecutive resource collision in the plurality of transmission periods.

In an embodiment, the processing unit is configured to: determine a second number of transmission failures, the second number of transmission failures being a sum of a number of failures of first transmissions of the transmission block and a number of failures of retransmissions of the transmission block in a transmission period included in a second window, and the second window including one transmission period; and determine, in response to determining that the second number of transmission failures is greater than or equal to a threshold of the second number of transmission failures allowed within the second window, that the reserved resource for transmitting data is subject to the consecutive resource collision in the plurality of transmission periods.

In an embodiment, the processing unit is configured to: determine a third number of transmission failures, the third number of transmission failures being a sum of a number of failures of first transmissions of the transmission block and a number of failures of retransmissions of the transmission block in each of a third plurality of transmission periods included in a third window, and the third window including the third plurality of transmission periods; and determine, in response to determining that the third number of transmission failures is greater than or equal to a threshold of the third number of transmission failures allowed within the third window, that the reserved resource for transmitting data is subject to the consecutive resource collision in the plurality of transmission periods.

In an embodiment, the communication device further includes a receiving unit configured to receive a resource consecutive collision indication from a second user device. The processing unit is configured to determine, in response to receiving the resource consecutive collision indication from the second user device, that the reserved resource for transmitting data is subject to the consecutive resource collision in the plurality of transmission periods. The resource consecutive collision indication is configured to indicate that the reserved resource for the first user device transmitting data is subject to the consecutive resource collision in the plurality of transmission periods.

In an embodiment, the receiving unit is configured to receive the resource consecutive collision indication from the second user device by multiplexing a physical sidelink feedback channel resource.

In an embodiment, the receiving unit is configured to receive a base sequence by using the physical sidelink feedback channel resource with a same time-frequency domain, and distinguish between a hybrid automatic retransmission request feedback and the resource consecutive collision indication according to different cyclic shift values of the base sequence.

In an embodiment, the processing unit is further configured to perform a resource reselection after stopping transmitting data with the reserved resource.

Another aspect of the present disclosure provides a communication device applied to a second user device, including:

a processing unit configured to determine that a reserved resource for a first user device transmitting data is subject to a consecutive resource collision in a plurality of transmission periods; and a transmitting unit configured to transmitting, in response to the processing unit determining that the reserved resource for the first user device transmitting data is subject to a consecutive resource collision in a plurality of transmission periods, a resource consecutive collision indication, where the resource consecutive collision indication is configured to indicate that the reserved resource for the first user device transmitting data is subject to the consecutive resource collision in the plurality of transmission periods.

In an embodiment, the processing unit is configured to: determine, in response to determining that a resource collision has occurred according to a received signal strength value on a sub-channel exceeding a signal strength threshold and determining that a value of a resource reservation period of the first user device is equal to a value of a resource reservation period of an other user device, that the reserved resource for the first user device transmitting data is subject to the consecutive resource collision in the plurality of transmission periods.

In an embodiment, the transmitting unit is configured to transmit the resource consecutive collision indication by multiplexing a physical sidelink feedback channel resource.

In an embodiment, the transmitting unit is configured to transmit a base sequence by using the physical sidelink feedback channel resource with a same time-frequency domain, and distinguish between a hybrid automatic retransmission request feedback and the resource consecutive collision indication according to different cyclic shift values of the base sequence.

It is further understood that the term "plurality" in the present disclosure means two or more, and other quantifiers are similar. The term "and/or," describing the association of associated objects, indicates that three relationships can exist, for example, A and/or B, which can indicate the presence of A alone, A and B together, and B alone. The character "/" generally indicates an "or" relationship between the preceding and following associated objects. The singular forms "a," "said" and "the" are also intended to include plural forms, unless the context clearly indicates otherwise.

It is further understood that the terms "first," "second" and the like are used to describe a variety of information, but that such information should not be limited to these terms. These terms are only used to distinguish information of the same type from one another and do not indicate a particular order or level of importance. In fact, the expressions "first" and "second" may be used interchangeably. For example, without departing from the scope of the present disclosure, first information may also be referred to as second information, and similarly, second information may also be referred to as first information.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Those skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A communication method applied to a first user device, comprising:

stopping, in response to determining that a reserved resource for transmitting data is subject to a consecutive resource collision in a plurality of transmission periods, transmitting data with the reserved resource, wherein determining that the reserved resource for transmitting data is subject to the consecutive resource collision in the plurality of transmission periods comprises:

determining, according to a number of transmission failures of a transmission block within a predetermined window and a predetermined threshold of the number of transmission failures, that the reserved resource for transmitting data is subject to the consecutive resource collision in the plurality of transmission periods.

2. The communication method according to claim 1, wherein determining, according to the number of transmission failures of the transmission block within the predetermined window and the predetermined threshold of the number of transmission failures, that the reserved resource for transmitting data is subject to the consecutive resource collision in the plurality of transmission periods comprises:

determining a first number of transmission failures, the first number of transmission failures being a number of failures of first transmissions of the transmission block in a first plurality of transmission periods within a first window, and the first window comprising the first plurality of transmission periods; and determining, in response to determining that the first number of transmission failures is greater than or equal to a threshold of the first number of transmission failures allowed within the first window, that the reserved resource for transmitting data is subject to the consecutive resource collision in the plurality of transmission periods.

3. The communication method according to claim 1, wherein determining, according to the number of transmission failures of the transmission block within the predetermined window and the predetermined threshold of the number of transmission failures, that the reserved resource for transmitting data is subject to the consecutive resource collision in the plurality of transmission periods comprises:

determining a second number of transmission failures, the second number of transmission failures being a sum of a number of failures of first transmissions of the transmission block and a number of failures of retransmissions of the transmission block in a transmission period comprised in a second window, and the second window comprising one transmission period; and determining, in response to determining that the second number of transmission failures is greater than or equal to a threshold of the second number of transmission failures allowed within the second window, that the reserved resource for transmitting data is subject to the consecutive resource collision in the plurality of transmission periods.

4. The communication method according to claim 1, wherein determining, according to the number of transmission failures of the transmission block within the predetermined window and the predetermined threshold of the number of transmission failures, that the reserved resource for transmitting data is subject to the consecutive resource collision in the plurality of transmission periods comprises:

determining a third number of transmission failures, the third number of transmission failures being a sum of a number of failures of first transmissions of the transmission block and a number of failures of retransmissions of the transmission block in each of a third plurality of transmission periods comprised in a third window, and the third window comprising the third plurality of transmission periods; and determining, in response to determining that the third number of transmission failures is greater than or equal to a threshold of the third number of transmission failures allowed within the third window, that the reserved resource for transmitting data is subject to the consecutive resource collision in the plurality of transmission periods.

5. The communication method according to claim 1, further comprising, after stopping transmitting data with the reserved resource:

performing a resource reselection.

6. A communication method applied to a second user device, comprising:

transmitting, in response to determining that a reserved resource for a first user device transmitting data is subject to a consecutive resource collision in a plurality of transmission periods, a resource consecutive collision indication, wherein the resource consecutive collision indication is configured to indicate that the reserved resource for the first user device transmitting data is subject to the consecutive resource collision in the plurality of transmission periods, wherein determining that the reserved resource for the first user device transmitting data is subject to the consecutive resource collision in the plurality of transmission periods comprises:

determining, in response to determining that a resource collision has occurred according to a received signal strength value on a sub-channel exceeding a signal strength threshold and determining that a value of a resource reservation period of the first user device is equal to a value of a resource reservation period of an other user device, that the reserved resource for the first user device transmitting data is subject to the consecutive resource collision in the plurality of transmission periods.

7. The communication method according to claim 6, wherein transmitting the resource consecutive collision indication comprises:

transmitting the resource consecutive collision indication by multiplexing a physical sidelink feedback channel resource.

8. The communication method according to claim 7, wherein transmitting the resource consecutive collision indication by multiplexing the physical sidelink feedback channel resource comprises:

transmitting a base sequence by using the physical sidelink feedback channel resource with a same time-frequency domain, and distinguishing between a hybrid automatic retransmission request feedback and the resource consecutive collision indication according to different cyclic shift values of the base sequence.

9. A communication device, comprising:

a processor; and a memory having processor-executable instructions stored thereon that, when being executed by the processor, cause the processor to implement a communication method comprising:

stopping, in response to determining that a reserved resource for transmitting data is subject to a consecutive resource collision in a plurality of transmission periods, transmitting data with the reserved resource, wherein determining that the reserved resource for transmitting data is subject to the consecutive resource collision in the plurality of transmission periods comprises:

determining, according to a number of transmission failures of a transmission block within a predetermined window and a predetermined threshold of the number of transmission failures, that the reserved resource for transmitting data is subject to the consecutive resource collision in the plurality of transmission periods.

10. The communication device according to claim 9, wherein determining, according to the number of transmission failures of the transmission block within the predetermined window and the predetermined threshold of the number of transmission failures, that the reserved resource for transmitting data is subject to the consecutive resource collision in the plurality of transmission periods comprises:

determining a first number of transmission failures, the first number of transmission failures being a number of failures of first transmissions of the transmission block in a first plurality of transmission periods within a first window, and the first window comprising the first plurality of transmission periods; and determining, in response to determining that the first number of transmission failures is greater than or equal to a threshold of the first number of transmission failures allowed within the first window, that the reserved resource for transmitting data is subject to the consecutive resource collision in the plurality of transmission periods.

11. The communication device according to claim 9, wherein determining, according to the number of transmission failures of the transmission block within the predetermined window and the predetermined threshold of the number of transmission failures, that the reserved resource for transmitting data is subject to the consecutive resource collision in the plurality of transmission periods comprises:

determining a second number of transmission failures, the second number of transmission failures being a sum of a number of failures of first transmissions of the transmission block and a number of failures of retransmissions of the transmission block in a transmission period comprised in a second window, and the second window comprising one transmission period; and determining, in response to determining that the second number of transmission failures is greater than or equal to a threshold of the second number of transmission failures allowed within the second window, that the reserved resource for transmitting data is subject to the consecutive resource collision in the plurality of transmission periods.

12. The communication device according to claim 9, wherein determining, according to the number of transmission failures of the transmission block within the predetermined window and the predetermined threshold of the number of transmission failures, that the reserved resource for transmitting data is subject to the consecutive resource collision in the plurality of transmission periods comprises:

determining a third number of transmission failures, the third number of transmission failures being a sum of a number of failures of first transmissions of the transmission block and a number of failures of retransmissions of the transmission block in each of a third plurality of transmission periods comprised in a third window, and the third window comprising the third plurality of transmission periods; and determining, in response to determining that the third number of transmission failures is greater than or equal to a threshold of the third number of transmission failures allowed within the third window, that the reserved resource for transmitting data is subject to the consecutive resource collision in the plurality of transmission periods.

\* \* \* \* \*